No. 622,341. Patented Apr. 4, 1899.
H. N. FLEMING.
HOOK FOR MAIL CATCHERS.
(Application filed Jan. 25, 1898.)
(No Model.)
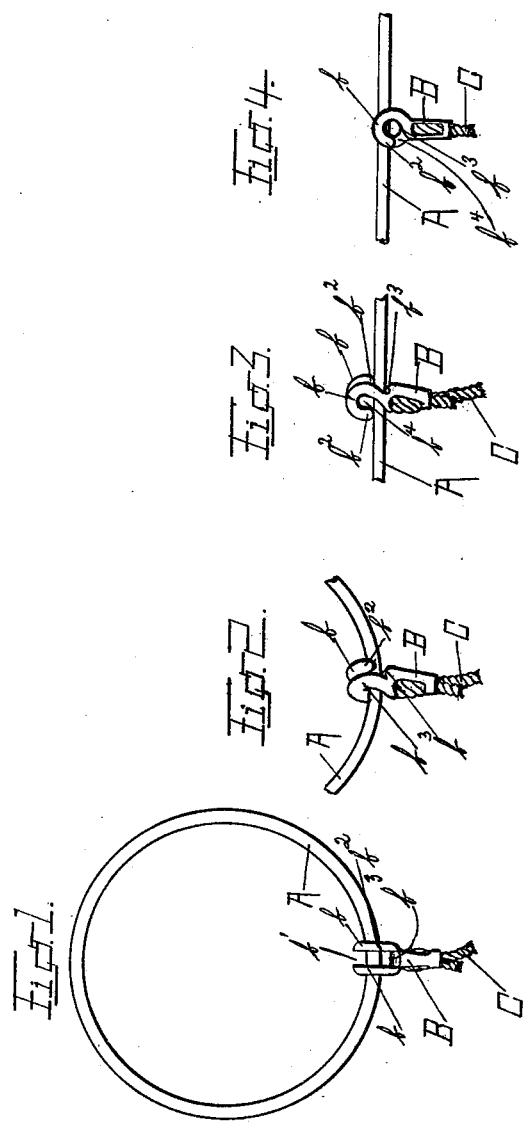
WITNESSES:
John Lord.
M. G. Stone
INVENTOR
Hugh N. Fleming
BY
N. C. Lord.
ATTORNEY.

UNITED STATES PATENT OFFICE.

HUGH N. FLEMING, OF ERIE, PENNSYLVANIA.

HOOK FOR MAIL-CATCHERS.

SPECIFICATION forming part of Letters Patent No. 622,341, dated April 4, 1899.

Application filed January 25, 1898. Serial No. 667,899. (No model.)

*To all whom it may concern:*

Be it known that I, HUGH N. FLEMING, a citizen of the United States, residing at Erie, in the county of Erie and State of Pennsylvania, have invented certain new and useful Improvements in Hooks for Mail-Catchers, &c.; and I do hereby declare the following to be a full, clear, and exact description of the invention, such as will enable others skilled in the art to which it appertains to make and use the same.

This invention relates to hooks for mail-catchers, &c.; and it consists in certain improvements in the construction thereof, as will be hereinafter fully described, and pointed out in the claim.

The invention is illustrated in the accompanying drawings as follows:

Figure 1 shows the hook in engagement with a curved bar or ring. Figs. 2, 3, and 4 show the hook in successive positions relatively to the bar.

A marks the bar with which the hook is adapted to engage, B the hook-shank, and C an extension to the shank, which, as shown, is in the form of a rope. Two hook members $b\ b$ extend from the shank side by side, the points $b^2\ b^2$ being turned in opposite directions and the hooks forming a passage $b'$ between them. The disengagement of hook from the bar is shown in successive stages. In Fig. 1 the hook is in engagement. In Fig. 2 the hook has been raised and turned as far as possible with the hook in line with the plane of the ring. In Fig. 3 the ring has been brought around so that its plane is at right angles to the hook and the hook has been turned so that the points $b^2$ are by the thickest portion of the bar. Fig. 4 shows the hook disengaged and with the bar in the passage $b'$.

It will be noted that the points $b^2$ of the hook members are so located and proportioned relatively to the butt $b^3$ of the shank that the passage $b^4$ is not large enough to allow the disengagement of the hook without turning it to an angle to the plane of the ring or curved bar. This reduces the possibility of the accidental disengagement of the hook to a minimum. In the construction shown the hook is adjusted to require the bringing of the plane of the bar to a right angle to the hook before a disengagement can be effected. This may be varied, however, so that the disengagement may be effected with the parts at less than a right angle to each other, or it may be so proportioned as to require the turning of the bar to a position extending directly back from the hooks before a disengagement can be effected.

From the foregoing it will be manifest that while the hook shown is desirable when a straight bar is used it is peculiarly efficient when used in combination with a curved bar.

What I claim as new is—

In combination with a curved bar; a hook composed of two members secured to the same shank and arranged side by side with a passage to allow the entry of the bar between them, said members of the hook having their points oppositely faced and so located relatively to the shank as to prevent the disengagement of the hook from the bar with the plane of the bar in line with the hook.

In testimony whereof I affix my signature in presence of two witnesses.

HUGH N. FLEMING.

Witnesses:
J. M. SHERWIN,
W. P. GIFFORD.